(No Model.) 2 Sheets—Sheet 2.
H. R. SILLMAN.
WOOD TURNING MACHINE.
No. 244,940. Patented July 26, 1881.
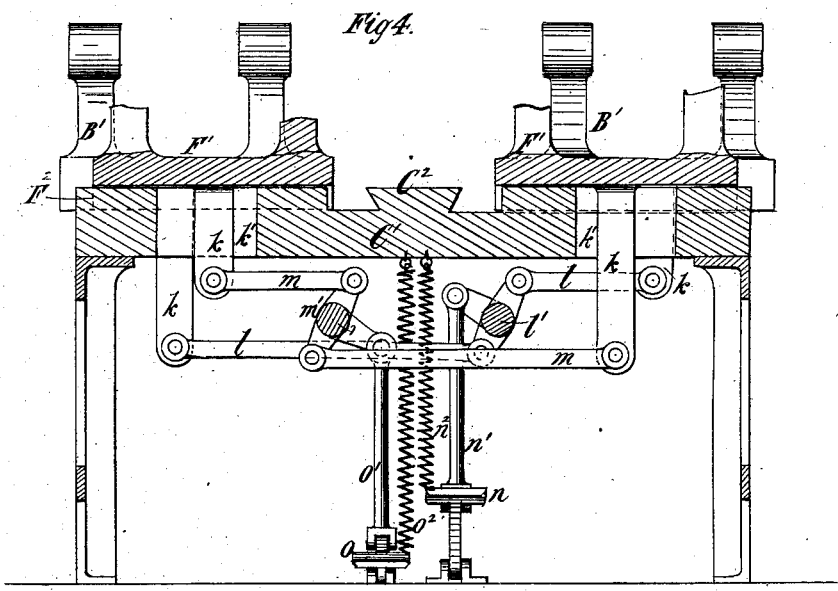
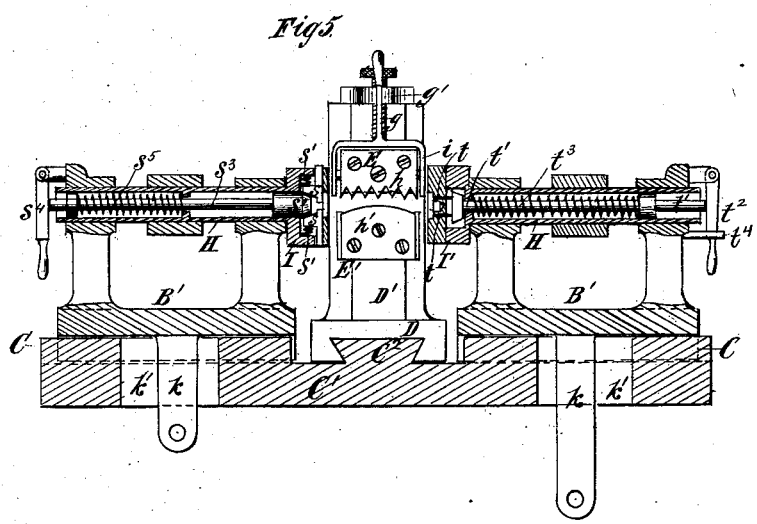

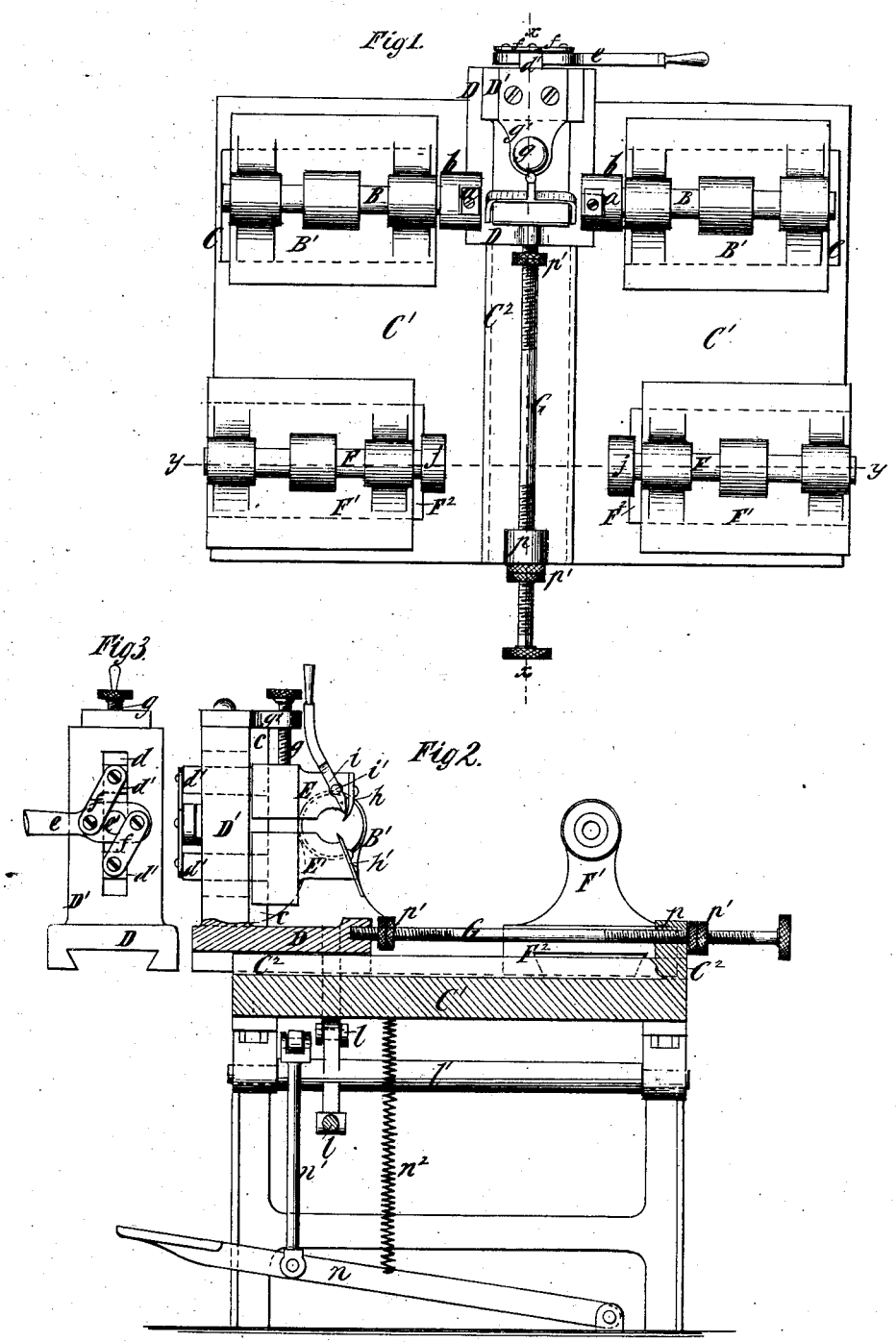

UNITED STATES PATENT OFFICE.

HENRY R. SILLMAN, OF BROOKLYN, NEW YORK, ASSIGNOR TO THE MERRICK THREAD COMPANY, OF HOLYOKE, MASSACHUSETTS.

WOOD-TURNING MACHINE.

SPECIFICATION forming part of Letters Patent No. 244,940, dated July 26, 1881.

Application filed May 23, 1881. (No model.)

*To all whom it may concern:*

Be it known that I, HENRY R. SILLMAN, of the city of Brooklyn, in the county of Kings and State of New York, have invented certain new and useful Improvements in Wood-Turning Machines, of which the following is a specification.

Although my invention may be embodied in machines for turning various articles, it is especially applicable to machines for turning wood bobbins for sewing-machine shuttles, which require to be turned upon their periphery to hold the thread and to have the ends turned down to form journals.

The invention consists in the combination, in a wood-turning machine, of two rotary tool-spindles adapted to carry cutters for operating upon the ends of an article, and movable toward and from each other, two heads or jaws adapted to receive and gripe between them the said article, and carrying a knife or knives, and rotary devices for subsequently grasping said article at the ends and rotating it to cause said knife or knives to turn its periphery.

The invention also consists in the combination of two rotary spindles adapted to receive between their ends an article to be turned, heads or jaws adapted to receive and gripe said article between them, and carrying a knife or knives for turning the periphery of said article, and a knife or knives pivoted at the sides of one of said heads and adapted to be swung or oscillated to turn shoulders upon said article.

The invention also consists in the combination, with the two heads which are adapted to receive and gripe an article between them, of novel means for moving them, an adjustable stop for limiting the movement of said heads, and a novel arrangement of devices for adjusting the two spindle-heads toward and from each other.

The invention also consists in the combination, in a wood-turning machine, of two pairs of rotary spindles, the spindles of each pair being adapted to be moved toward and from each other, knife-heads adapted to receive and gripe an article to be turned between them, and a movable carriage for transferring the article being operated on from one pair of spindles to the other, whereby provision is afforded for first griping the article and turning the ends, and then griping the ends and turning the periphery of the bobbin or other article.

The invention also consists in novel details of construction and combinations of parts, to be hereinafter fully described.

In the accompanying drawings, Figure 1 represents a plan of a machine embodying the invention. Fig. 2 represents a section upon the dotted line *x x*, Fig. 1. Fig. 3 represents a rear elevation of the carriage which supports the knife-heads, between which the work is received and griped. Fig. 4 represents a section of certain parts of the machine upon the dotted line *y y*, Fig. 1; and Fig. 5 represents a sectional elevation of a modified form of machine also embodying my invention.

Similar letters of reference designate corresponding parts in all the figures.

Referring now to Figs. 1, 2, 3, and 4, B B designate a pair of tool-spindles, which may be rotated by means of a belt passing around pulleys thereon, and which are mounted in spindle heads or stocks B' B'. The said heads or stocks are adapted to be moved toward and from each other upon dovetailed ways or guides C, upon the upper surface of a base-plate or frame, C', thus also moving the spindles B toward and from each other. Upon the ends of the spindles B are knives or cutters *a*, which are secured in suitable chucks, *b*.

D designates a carriage movable in a direction transverse to the length of the spindles B along a dovetailed way or guide, C², upon the base-piece C', as best seen in Fig. 2. Erected upon the carriage D is an upright, D', which in reality constitutes a part of the carriage. On the front of the upright D' is formed a dovetailed guide or way, *c*, and E E' designate two knife-heads, which are adapted to be moved up and down upon said guide to cause them to approach and recede from each other. In the upright D' is a slot, *d*, and the heads E E' are furnished with arms or projections *d'* fitting in said slot, as seen in Fig. 3. The two heads E E' are moved toward and from each other by a lever, *e*, pivoted at *e'* and connected upon opposite sides of its pivot with the projections $d'$ by links $f$. Hence it will be understood that by rocking or oscillating the lever $e$ the heads may be drawn together to clamp an article between them or moved apart to release said article. In order to limit the extent to which the two heads E E' may be drawn together, I provide a stop consisting of a screw, $g$, passing loosely through a lug, $g'$, upon the upright D', and screwed into the upper head, E. By said screw the extent of downward movement of the head E is determined, and consequently the extent of upper movement of the lower head, E'.

Upon the heads E E' are fixed knives $h\ h'$, the former of which may have a toothed or serrated edge to turn roughly, while the second may have a smooth edge for finished turning. One knife only might be used in some cases.

In order to turn down the shoulders at the end of a bobbin, I employ a bifurcated knife or cutter, $i$, which is pivoted at $i'$ to the upper head, and is provided with an upwardly-projecting handle, whereby it may be rocked or turned on its pivots to cause its points to operate upon the article being turned to form shoulders thereon.

F designates the other spindles, mounted in spindle heads or stocks F', which are movable toward and from each other upon dovetailed ways or guides $F^2$ formed on the base plate or piece C'. The spindles F are provided at their ends with chucks $j$, which, when the two spindles are brought together, gripe upon the ends of the article being turned and constitute rotary devices for turning said article.

Each of the spindle heads or stocks B' F' is provided with a downwardly-projecting arm or lug, $k$, which works in a slot, $k'$, in the base-piece C', and the heads B' of one pair are connected by rods $l$ with a rock-shaft, $l'$, while the heads F' of the other pair are connected by rods $m$ with a second rock-shaft, $m'$, as best seen in Fig. 4. The two rock-shafts $l'\ m'$ may be rocked to draw the heads together by means of treadles $n\ o$, connected with the rock-shafts by rods $n'\ o'$, and said shafts are rocked in the opposite direction by means of springs $n^2\ o^2$ for elevating the treadles.

In the operation of my machine a blank of a size to form a bobbin is placed between the heads E E' and clamped or griped so as to hold it stationary. The two spindles B are then drawn together and turn journals upon the bobbin at both ends. The carriage D is then moved along its guide or way until the bobbin is brought into line with the two spindles F, which are then drawn together to clamp or gripe the journals of the bobbin, the heads E E' being first released to permit the blank to rotate with the spindles F. The heads E E' are now moved gradually toward each other and the knives $h\ h'$ operate upon the periphery of the bobbin. The swinging knife $i$ is now oscillated or swung forward to cause its points to operate on the bobbin-blank to form shoulders thereon.

G designates a screw-threaded rod or stem, projecting from the carriage D and sliding freely in a bearing, $p$. Upon the rod G are pairs of jam-nuts $p'$, which may be adjusted so as to form stops to limit the extent of movement of the carriage in either direction. After being turned the bobbin may be wound in any suitable machine, or, indeed, while rotated by the spindles F, if desirable.

In Fig. 5 I have represented a machine which may be employed to turn the journals and periphery of bobbins by one pair of spindles, and which I will now describe.

H designates two tool-spindles, which are mounted in spindle heads or stocks B' B', similar to those previously described, and adapted to be moved toward and from each other in the same way.

The carriage D and the heads E E', with the knives $h\ h'\ i$, together with the mechanism for moving the heads E E' toward and from each other, are all similar to like parts described with reference to Figs. 1, 2, 3, and 4.

The spindles H are both tubular and carry chucks I I', which, with the spindles, are the only parts necessary to particularly describe.

In the chucks I I' are secured knives similar to the knives $a$ shown in Fig. 1, and as they are of common form I have not thought it necessary to again show them. They serve to turn the journals upon the ends of the bobbins.

In the chuck I are a number of jaws, $s$, which radiate from the center, and are impelled inward by springs $s'$, and may be moved outward by a conical center, $s^2$, secured to the end of a rod, $s^3$, extending through the hollow spindle H. When it is desired to spread the jaws $s$ the rod $s^3$ is pushed slightly inward by a hand-lever, $s^4$; but when the lever is released the rod is returned by a spring, $s^5$, and the jaws $s$ are free to move inward.

In the chuck I' are sharp projections or points $t$, carried by a rod, $t'$, extending through the hollow spindle H, and adapted to be moved inward by a hand-lever, $t^2$, for advancing said points, and returned by a spring, $t^3$, when said lever is released. The lever $t^2$ may be held by means of a catch, $t^4$, when moved inward. The chuck I' forms the driving-chuck for rotating the bobbin.

In the operation of this machine the blank is clamped between the heads E E', as before described, and the spindles H are drawn together to cause the knives carried by the chucks I I' to cut journals upon the ends of the bobbin. The heads E E' are then released, and the hand-lever $t^2$ is manipulated to push the rod $t'$ inward and cause the points $t$ to advance into the wood. The bobbin will then be rotated with the spindles, and its periphery may be turned by the knives $h\ h'$, and its shoulders with the knife $i$, as previously described.

By my invention I provide a single machine in which bobbins may be completed, and, if desired, also wound, without the necessity of having several machines for the purpose.

The knives which are placed in the chucks

I I' should be placed so as to come between the jaws s, and also so as to be out of the way of the pins t.

I do not here claim, broadly, the combination of two spindles movable toward and from each other, and adapted to grasp the work between their ends, a cutter head or stock movable transversely to the work and carrying knives or cutters for turning the periphery and ends of an article, as such subject-matter is embraced in another application of mine for Letters Patent.

What I claim as my invention, and desire to secure by Letters Patent, is—

1. In a machine for turning wood, the combination of two tool-spindles adapted to carry cutters for turning the ends of an article, and movable toward and from each other, two heads or jaws carrying a knife or knives and movable toward each other to gripe and hold the article between them while its ends are being turned, and rotary devices for grasping said article at the ends and rotating it to cause said knife or knives to turn its periphery, substantially as specified.

2. In a wood-turning machine, the combination of two rotary spindles adapted to hold between their ends an article to be turned, heads or jaws adapted to receive said article between them and carrying a knife or knives for turning the periphery of said article, and a knife or knives pivoted at the sides of one of said heads and adapted to be swung or oscillated to turn shoulders upon said article, substantially as specified.

3. The combination of the two rotary spindles F, the carriage D, the knife-heads E E' adjustable thereon, the knives h h', and the bifurcated knife i, pivoted at the sides of the head E, substantially as specified.

4. The combination of the two rotary spindles B, the carriage D, movable toward and from the work, the knife-heads E E', the lever e, and the links f f, for moving said heads toward and from each other, substantially as specified.

5. The combination of the carriage D, the knife-heads E E', the lever e, and links f f, for moving said heads toward and from each other, and the adjustable stop g for limiting the movement of said heads, substantially as specified.

6. In a wood-turning machine, the combination of a bed plate or frame, two spindles adapted to carry knives for turning the ends of an article, spindle-heads movable toward and from each other and provided with arms which project below said bed plate or frame, cutter-heads adapted to receive and gripe said article between them, a rock-shaft and treadle, and rods connecting said rock-shaft with the arms of said spindle-heads for moving said heads toward and from each other, substantially as specified.

7. In a wood-turning machine, the combination of two pair of rotary spindles, the spindles of each pair being adapted to be moved toward and from each other, knife-heads adapted to receive and gripe an article between them, and a movable carriage for transferring the article being operated upon from one pair of spindles to the other, substantially as and for the purpose specified.

8. The combination of the two pairs of spindles B F, the carriage D, the knife-heads E E', supported in said carriage, and the screw G and nuts p' for limiting the motion of the said carriage, substantially as specified.

HENRY R. SILLMAN.

Witnesses:
CHANDLER HALL,
T. J. KEANE.